United States Patent [19]
Williams

[11] 3,874,704
[45] Apr. 1, 1975

[54] TRAILER HITCH

[76] Inventor: Thomas C. Williams, 7740 W. Whitecrane Rd., Atwater, Calif. 95301

[22] Filed: Jan. 10, 1974

[21] Appl. No.: 432,397

[52] U.S. Cl.......... 280/479 R, 280/415 A, 280/515
[51] Int. Cl............................................. B60d 1/00
[58] Field of Search........ 280/479 A, 479 R, 461 A, 280/515, 415 A

[56] References Cited
UNITED STATES PATENTS

| | | | |
|---|---|---|---|
| 2,475,761 | 7/1949 | Shook | 280/515 |
| 2,514,614 | 7/1950 | von Schlegell | 280/479 A X |
| 2,793,880 | 5/1957 | Oehler et al. | 280/461 A |
| 3,190,677 | 6/1965 | Robbins | 280/515 |
| 3,421,779 | 1/1969 | Shelby | 280/479 R |
| 3,450,220 | 6/1969 | Frandsen et al. | 280/479 R X |

Primary Examiner—Leo Friaglia
Attorney, Agent, or Firm—Flehr, Hohbach, Test, Albritton & Herbert

[57] ABSTRACT

A trailer hitch which can be mounted to the usual three point hitch of a tractor and which can be operated by the tractor operator from his seated position. The trailer hitch includes a horizontal bar for connection to the lift arms of a three point hitch, and an upright bar for connection to the center link of the three point hitch. A sleeve is secured to the two bars and a pull pin is slidably engaged in the sleeve for movement into and out of a position for capturing the tongue of a trailer to be pulled. The pull pin is spring loaded and connected to a lever arm reachable from the seat of the tractor. The vertical position of the trailer hitch can be adjusted by use of the three point hitch and by backing the tractor toward the trailer to be picked up with the pull pin being held open, the pin can be aligned with the opening in the tongue on the trailer and released therethrough to make the connection between the tractor and trailer.

2 Claims, 4 Drawing Figures

TRAILER HITCH

BACKGROUND OF THE INVENTION

Tractors have been used to haul trailers since the advent of tractors themselves. However, the interconnection and release of the trailer from the tractor has in the past always required either that the tractor driver dismount and manually perform the operation or that a second person be employed to do so. Either alternative is quite inefficient.

SUMMARY OF THE INVENTION AND OBJECTS

A trailer hitch for connection to a three point hitch including a horizontal and an upright bar carrying a moveable pin, the pin being resiliently urged to an extended position for engaging the trailer to be hitched and a lever for overcoming the resilience and urging the pin to a retracted non-engaging position.

It is, therefore, a general object of this invention to provide an improved trailer hitch for attachment to tractors and the like having a three point hitch.

It is a more particular object of the invention to provide such an improved trailer hitch which permits the connection or disconnection of a trailer from a tractor to be completed by the tractor operator from the seat of the tractor.

DETAILED DESCRIPTION OF THE PREFERRED EMBODIMENT

Figure 1:
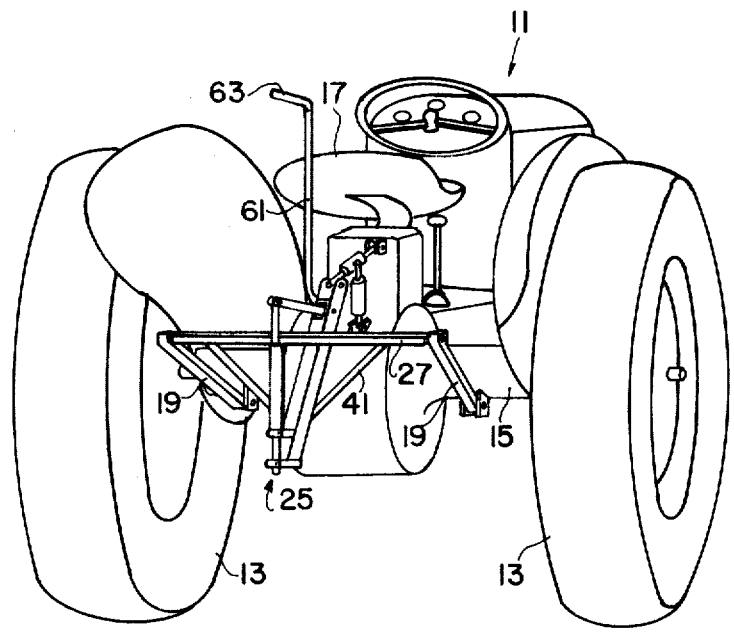
FIG. 1 is a perspective view showing a tractor carrying a trailer hitch in accordance with the invention.
Figure 3:
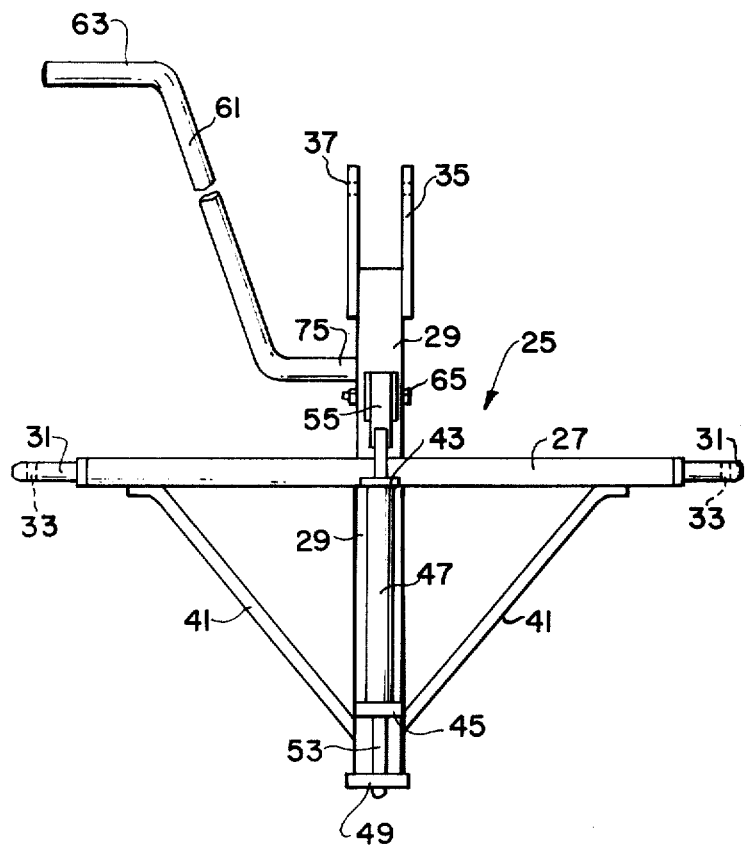
FIG. 3 is a rear elevation of the trailer hitch shown in FIG. 2.

Referring to the drawing there is shown a tractor 11 of the usual configuration having a pair of rear wheels 13, a rear axle 15 and operator's seat 17. In addition, the tractor is equipped with a conventional three point hitch having lower lift arms 19, an adjustable top link 21 and hydraulic operating cylinder 23.

The trailer hitch 25 in accordance with the invention includes a horizontal bar 27 and an upright bar 29 secured thereto by welding or the like. A stabilizing yoke 30 is welded to the two bars to provide rigidity to their interconnection. The outer extremities of the horizontal bar 27 includes cylindrical pins 31 for connection to the lift arms 19. Cotter pin openings 33 are provided for securing the horizontal bars 27 to the lift arms 19.

The upper end of the upright bar 29 includes a clevis type extension 35 having openings 37 through which the upright arm 29 is secured to the lift link 21 by means of a pin 39.

Upper and lower rearwardly extending bars 43 and 45 are welded to the upright bar 29 and carry between them a vertical tube 47. A third rearwardly extending bar 49 is secured to the bottom of the upright bar 29 and has an opening 51 therein which lies in registry with the tube 47. The rearwardly extending arms 45 and 49 together form a clevis type yoke.

A pin 53 is slidably engaged within the tube 47 and at its upper end is connected to an arm 55 by means of a pin 57 passing through slot 59 in the arm 55 and through a hole in the upper end of the pin 53 itself.

The arm 55 forms one leg of a crank, the other leg being an extension 61 having a handle 63 at the end thereof. The arm 55 passes through the upright bar 29 and is pivoted thereat by means of a pin 65 which may be in the form of a nut and bolt.

Figure 2:
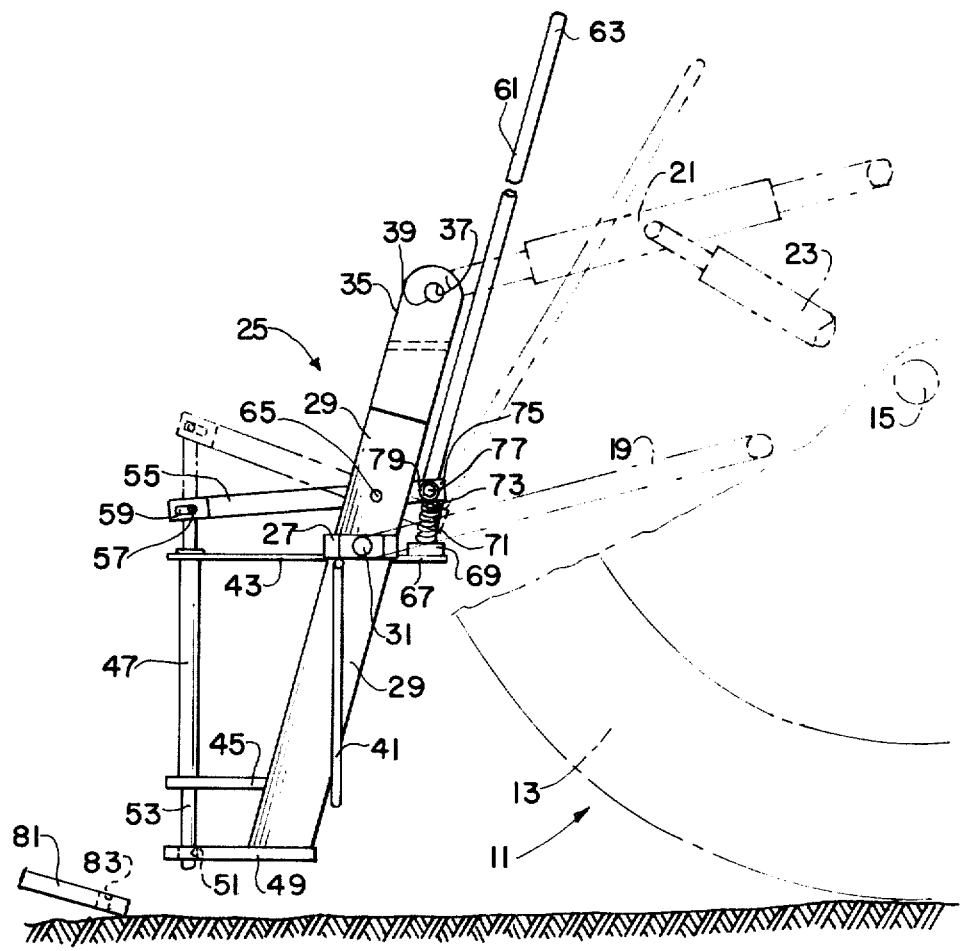
FIG. 2 is a side elevational view showing the trailer hitch in accordance with the invention mounted on a tractor and prepared for engagement with the tongue of a trailer.
Figure 4:
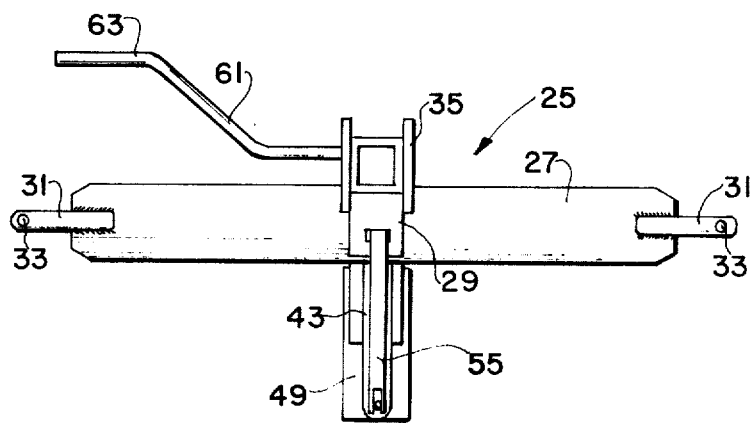
FIG. 4 is a top plan view of the trailer hitch shown in FIG. 2.

A forwardly extending plate 67 is secured to the upright arm 29 and carries a cup 69 which serves to capture the lower end of a compression spring 71. The upper end of the spring is captured on the rear of the arm 55 by means of a downwardly extending stud 73. The crank then, including the arms 55 and 61, is resiliently urged in the counterclockwise direction about the pin 65 as shown in FIG. 2 thereby urging the pin 53 downwardly through the opening 51 in the plate 49. The opening in the upright member 29 through which the arm 55 extends serves as a stop to limit the movement of the arm 55 and thereby maintain the spring 71 captured between the cup 69 and stud 73.

In order for the trailer hitch in accordance with the invention to be useful with a variety of tractors, the angle between the arms 55 and 61 is made adjustable. To this end the lower end 75 of the arm 61 is terminated in a screw thread and is secured to the arm 55 by means of nuts 77 and lock washers 79 of the internal and external star type.

Operation of the trailer hitch in accordance with the invention will be shown most clearly with reference to FIG. 2 wherein there is shown the tongue 81 of a trailer to be picked up, the tongue having an opening 83 therein for cooperation with the pin 53.

The trailer hitch is first secured to the three point hitch of the tractor, adjusting the top link 21 so that the tube 47 is appropriately vertical.

In order to pick up the trailer, once the trailer hitch is installed, the operator need merely reach backward and pull the handle 63 toward him thereby raising the pin 53 into the tube 47. The three point hitch is then utilized to lower the yoke formed by the rearwardly extending bars 45 and 49 into vertical alignment with the tongue 81 (in the case shown in FIG. 2 the bar 49 is actually lowered into the ground) and, with the tractor being backed up, passing the bar 49 under the tongue 81 until the pin 53 lies in registry with the opening 83. The handle 63 is then released permitting the pin to drop through the tongue 81. The three point hitch is then raised carrying the tongue 81 and the attached trailer. In reverse the trailer may be released to lower the tongue 81 either onto the ground or onto some rest which would leave the end of the tongue 81 above ground. When the tongue 81 is in the position desired, the operator need merely pull the lever 73 toward him then drive the tractor away thereby leaving the trailer behind.

I claim:

1. A trailer hitch for attachment to a three point hitch on a tractor and operable from the operator's seat on the tractor for coupling a trailer thereto and releasing the coupling, said trailer hitch comprising a frame adapted to be vertically moveable with the three point hitch, a pin carried by said frame and movable between an extended position for engagement with the trailer and a retracted position, means coupled between said frame and said pin for resiliently urging the pin into said extended position and a crank pivoted on said frame, said crank including a first arm having one end connected to said pin and a second arm extending upwardly and joined at its lower end to the other end of the first arm, said second arm being adapted to be reached by an operator in the seat of the tractor.

2. A trailer hitch as defined in claim 1 wherein means are provided for selectively varying the angle between said first and second arms.

* * * * *